(12) United States Patent
Choi et al.

(10) Patent No.: US 12,728,751 B2
(45) Date of Patent: Sep. 8, 2026

(54) POWER SYSTEM FOR ELECTRIFIED VEHICLE AND CONTROL METHOD THEREOF

(71) Applicants: Hyundai Motor Company, Seoul (KR); Kia Corporation, Seoul (KR)

(72) Inventors: Min Seong Choi, Hwaseong-si (KR); In Yong Yeo, Bucheon-si (KR); Jong Eun Byun, Suwon-si (KR); Sang Jin Kim, Hwaseong-si (KR); Jin Young Yang, Hanam-si (KR); Si Hun Yang, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 738 days.

(21) Appl. No.: 18/303,079

(22) Filed: Apr. 19, 2023

(65) Prior Publication Data

US 2024/0149733 A1 May 9, 2024

(30) Foreign Application Priority Data

Nov. 4, 2022 (KR) ........................ 10-2022-0146200

(51) Int. Cl.
*B60L 50/16* (2019.01)
*B60L 7/14* (2006.01)
*B60L 50/51* (2019.01)
*B60L 53/62* (2019.01)

(52) U.S. Cl.
CPC ................. *B60L 53/62* (2019.02); *B60L 7/14* (2013.01); *B60L 50/51* (2019.02); *B60L 2210/10* (2013.01); *B60L 2210/30* (2013.01); *B60L 2210/40* (2013.01)

(58) Field of Classification Search
CPC ...... B60L 53/62; B60L 50/51; B60L 2210/10; B60L 50/16; B60L 53/55
See application file for complete search history.

(56) References Cited

U.S. PATENT DOCUMENTS

2015/0311831 A1* 10/2015 Yamada .................. B60L 50/16
307/82
2024/0088665 A1* 3/2024 Giri ......................... B60L 53/55

FOREIGN PATENT DOCUMENTS

KR 20170006568 A 1/2017

* cited by examiner

*Primary Examiner* — Cortez M Cook
(74) *Attorney, Agent, or Firm* — Slater Matsil, LLP

(57) ABSTRACT

A power system for an electrified vehicle comprising a first power source device, a first converter having a first end connected to the first power source device, a second power source device, a motor driving device comprising a motor and an inverter, a switch device configured to selectively connect a second end of the first converter to the second power source device or the motor driving device, and a controller configured to control the switch device such that the second end of the first converter is connected to the second power source device when the first power source device is charged with power of the second power source device and such that the second end of the first converter is connected to the motor driving device when the motor performs regenerative braking.

17 Claims, 10 Drawing Sheets

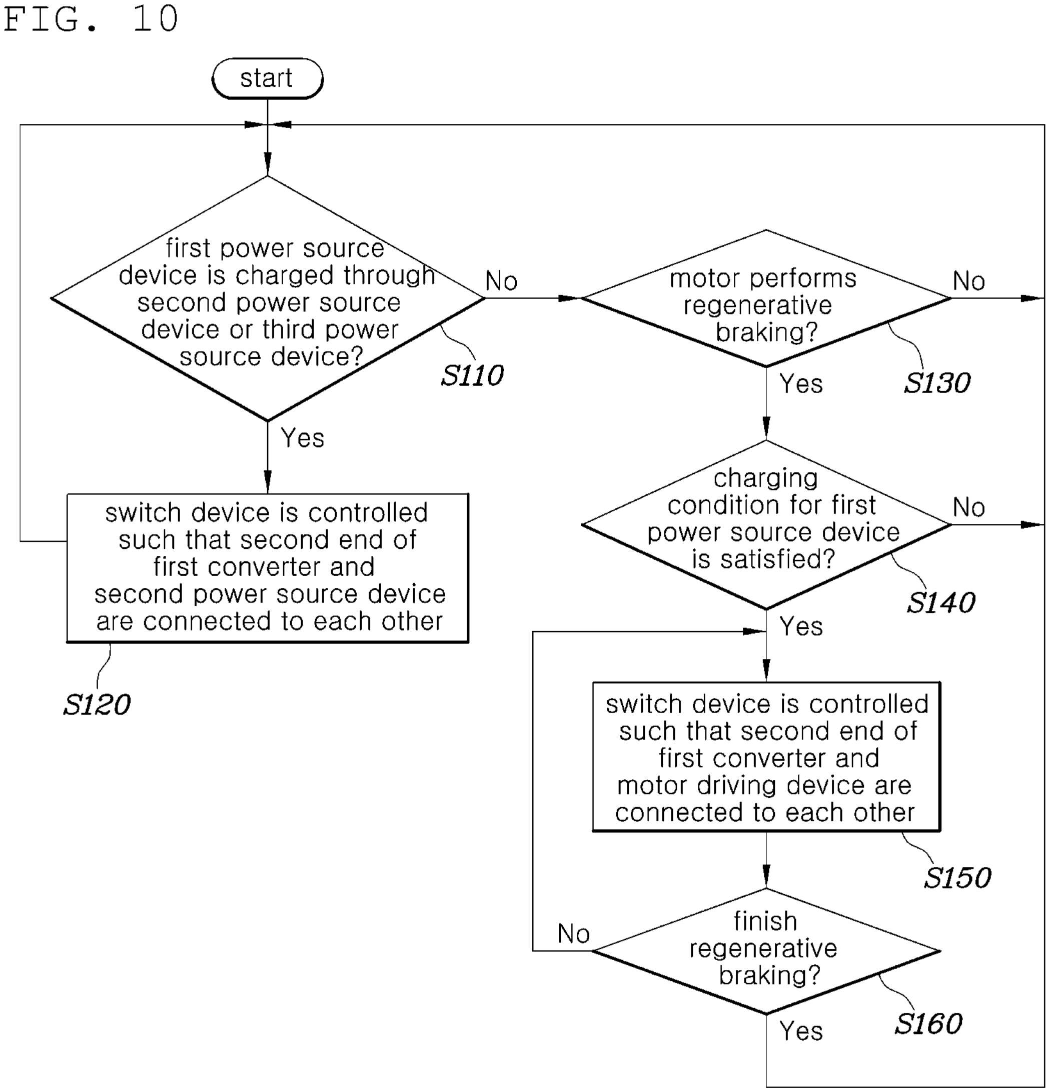
FIG. 10
start
first power source device is charged through second power source device or third power source device?
S110
No
Yes
switch device is controlled such that second end of first converter and second power source device are connected to each other
S120
motor performs regenerative braking?
S130
No
Yes
charging condition for first power source device is satisfied?
S140
No
Yes
switch device is controlled such that second end of first converter and motor driving device are connected to each other
S150
finish regenerative braking?
S160
No
Yes

POWER SYSTEM FOR ELECTRIFIED VEHICLE AND CONTROL METHOD THEREOF

CROSS-REFERENCE TO RELATED APPLICATIONS

This application claims the benefit and priority of Korean Patent Application No. 10-2022-0146200, filed on Nov. 4, 2022, which application is hereby incorporated herein by reference.

TECHNICAL FIELD

The present disclosure relates to a power system for electrified vehicle and control method thereof.

BACKGROUND

In general, an electrified vehicle includes a high-voltage battery for supplying power for driving and an auxiliary battery for supplying power to electrical loads. A high-voltage battery is connected to a motor that drives an electrified vehicle and an auxiliary battery has a ceiling voltage range lower than that of a high-voltage battery.

An electrified vehicle includes a Low voltage Dc-dc Converter (LDC) that is a power converter that is connected to an auxiliary battery and electrical loads and charges the auxiliary battery by reducing the voltage of a high-voltage battery.

A bidirectional power converter (e.g., a Bi-directional High voltage Dc-dc Converter (BHDC)) may be provided between a high-voltage battery and a motor, depending on vehicles, and in this case, efficiency may greatly decreases when an auxiliary battery is charged with energy generated by a motor in regenerative braking or is charged with power from the high-voltage battery.

For example, when a power line diverges to an LDC from a node between a bidirectional power converter and a high-voltage battery, regenerative braking energy can be transmitted to an auxiliary battery only when it passes through both the bidirectional power converter and the LDC. As another example, when a power line diverges to an LDC from a node between a bidirectional power converter and a motor, energy of a high-voltage battery can be transmitted to an auxiliary battery only when it passes through both the bidirectional power converter and the LDC.

Meanwhile, a hydrogen fuel cell vehicle of electrified vehicles may be additionally equipped with a fuel cell stack that supplies power to a high-voltage battery or a motor. When a hydrogen fuel cell vehicle is designed such that a fuel cell stack is disposed at an input end of an LDC and a DC converter or a diode is disposed between an input end node and a motor such that power flows only toward the motor, it is impossible to transmit regenerative braking force to an auxiliary battery.

The description provided above as a related art of the present disclosure is just for helping understanding the background of the present disclosure and should not be construed as being included in the related art known by those skilled in the art.

SUMMARY

The present disclosure relates to a method of controlling a power system for an electrified vehicle. Embodiments of the method are able to efficiently charge an auxiliary battery using power of a fuel cell or a high-voltage battery and regenerative braking energy of a motor in a power system, which includes an auxiliary battery and uses a fuel cell or a high-voltage battery as a power source, for an electrified vehicle.

The present disclosure has been made in an effort to solve problems discussed above. Embodiments of the present disclosure provide a power system for an electrified vehicle that can efficiently charge an auxiliary battery by determining a situation, in which charging power is provided to the auxiliary battery, and by adjusting connection at an end of an LDC in accordance with situations, and a method of controlling the power system.

The technical subjects to implement in the present disclosure are not limited to the technical problems described above and other technical subjects that are not stated herein will be clearly understood by those skilled in the art from the following specifications.

A power system for an electrified vehicle according to the present disclosure for achieving the objectives includes a first power source device, a first converter having a first end connected to the first power source device, a second power source device, a motor driving device including a motor and an inverter, and a switch device configured to selectively connect a second end of the first converter to the second power source device or the motor driving device. A controller is configured to control the switch device such that the second end of the first converter is connected to the second power source device when the first power source device is charged with power of the second power source device and such that the second end of the first converter is connected to the motor driving device when the motor performs regenerative braking.

For example, the switch device may include a first terminal connected to the second end of the first converter, a second terminal connected to the second power source device, and a third terminal connected to the motor driving device. The first terminal may be selectively connected to one of the second terminal or the third terminal.

For example, the power system may further include a second converter having both ends connected to the second power source device and the motor driving device, respectively, in which the second terminal may be connected to a node between the second power source device and the second converter and the third terminal may be connected a node between the second converter and the motor driving device.

For example, the controller may determine whether a charging condition for the first power source device is satisfied when the motor performs regenerative braking, and may control the switch device such that the second end of the first converter is connected to the motor driving device when the charging condition for the first power source device is satisfied.

For example, the charging condition for the first power source device may be a case in which regenerative braking power of the motor exceeds maximum power of the first converter and a State Of Charge (SOC) of the first power source device is less than a reference SOC.

For example, the power system may further include: a third power source device; and a third converter having a first end connected to the third power source device and a second end connected to the motor driving device.

For example, the switch device may selectively connect the second end of the first converter to a node between the third power source device and the third converter or a node between the third converter and the motor driving device.

For example, the controller may perform control such that the second end of the first converter is connected to the node between the third power source device and the third converter when the first power source device is charged with power of the third power source device and such that the second end of the first converter is connected to the node between the third converter and the motor driving device when the motor performs regenerative braking.

A method of controlling a power system for an electrified vehicle of the present disclosure for achieving the objective includes: determining whether a first power source device is charged with power of a second power source device or a motor performs regenerative braking when the first power source device is charged; and controlling a switch device such that the second end of the first converter is connected to the second power source device when the first power source device is charged with power of the second power source device and such that the second end of the first converter is connected to the motor driving device when the motor performs regenerative braking.

For example, the controlling of the switch device may include determining whether a charging condition for the first power source device is satisfied when the motor performs regenerative braking, and controlling the switch device such that the second end of the first converter is connected to the motor driving device when the charging condition for the first power source device is satisfied.

For example, the charging condition for the first power source device may be a case in which regenerative braking power of the motor exceeds maximum power of the first converter and an SOC of the first power source device is less than a reference SOC.

For example, the controlling of the switch device may further include performing control such that the second end of the first converter is connected to a third power source device when the first power source device is charged with power of the third power source device and such that the second end of the first converter is connected to the motor driving device when the motor performs regenerative braking.

According to the power system for an electrified vehicle and the method of controlling the power system of the present disclosure, the second end of the first converter is selectively connected to any one of the second power source device or the third power source device and the motor driving device in consideration of the charging situation of the first power source device, whereby it is possible to efficiently charge the first power source device.

The effects of the present disclosure are not limited to the effects described above and other effects can be clearly understood by those skilled in the art from the following description.

BRIEF DESCRIPTION OF THE DRAWINGS

The above and other objectives, features and other advantages of the present disclosure will be more clearly understood from the following detailed description when taken in conjunction with the accompanying drawings, in which:

FIG. 10 is a flowchart of a method of controlling a power system for an electrified vehicle according to an embodiment of the present disclosure.

DETAILED DESCRIPTION OF ILLUSTRATIVE EMBODIMENTS

Figure 1:
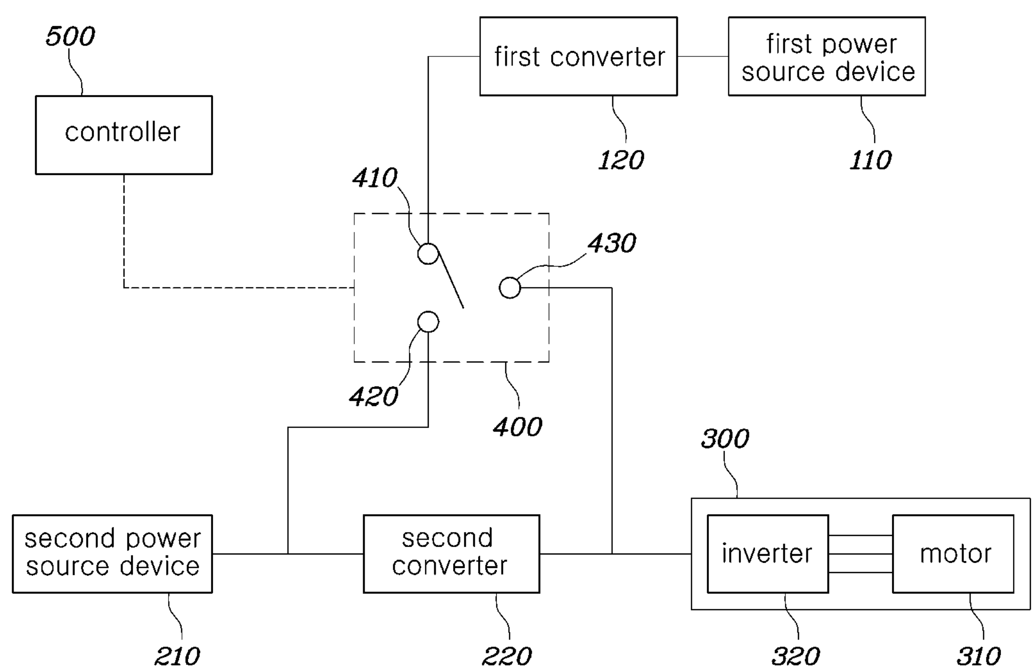
FIG. 1 is a block diagram showing the configuration of a power system for an electrified vehicle according to an embodiment of the present disclosure.

In the following description, if it is decided that the detailed description of known technologies related to the present disclosure makes the subject matter of the embodiments described herein unclear, the detailed description is omitted. Further, the accompanying drawings are provided only for easy understanding of embodiments disclosed in the specification, and the technical spirit disclosed in the specification is not limited by the accompanying drawings, and all changes, equivalents, and replacements should be understood as being included in the spirit and scope of the present disclosure.

Terms including ordinal numbers such as "first," "second," etc., may be used to describe various components, but the components are not to be construed as being limited to the terms. The terms are used only to distinguish one component from another component.

It is to be understood that when one element is referred to as being "connected to" or "coupled to" another element, it may be connected directly to or coupled directly to another element or be connected to or coupled to another element, having the other element intervening therebetween. On the other hand, it should to be understood that when one element is referred to as being "connected directly to" or "coupled directly to" another element, it may be connected to or coupled to another element without the other element intervening therebetween.

Singular forms are intended to include plural forms unless the context clearly indicates otherwise.

It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Hereafter, embodiments of the present disclosure will be described in detail with reference to the accompanying drawings and the same or similar components are given the same reference numerals regardless of the numbers of figures and are not repeatedly described.

A unit or a control unit that included in names such as and a hybrid control unit (HCU) and a vehicle control unit (VCU) is only a term that is generally used to name a controller that controls specific functions of a vehicle rather than meaning a generic function unit. For example, each control unit may include a communication device that communicates with another control unit or a sensor to control corresponding functions, a memory that stores an operating system or logic commands and input/output information, and one or more processors that performs determination, calculation, decision, etc. for controlling the corresponding functions.

First, a power system for an electrified vehicle according to an embodiment of the present disclosure is described with reference to FIG. 1.

FIG. 1 is a block diagram showing the configuration of a power system for an electrified vehicle according to an embodiment of the present disclosure.

Referring to FIG. 1, a power system for an electrified vehicle according to an embodiment may include a first power source device 110, a first converter 120 connected to the first power source device 110, a second power source device 210, a second converter 220 connected to the second power source device 210, a motor driving device 300, a switch device 400, and a controller 500. The motor driving device 300 may include a motor 310 and an inverter 320. FIG. 1 mainly shows components related to an embodiment of the present disclosure, and of course, actually fewer or more components may be included to implement a power system for an electrified vehicle.

Hereafter, components of the power system for an electrified vehicle are described.

The second power source device 210 may be always mounted in an electrified vehicle and may be connected to the motor driving device 300. The second power source device 210 can be used as a main power source that drives the motor 310 by outputting stored power. For example, the second power source device 210 may be a high-voltage battery disposed in an electrified vehicle.

The motor 310 of the motor driving device 300 may be used as a main driving source or an auxiliary driving source of an electrified vehicle and may be connected to the inverter 320. The inverter 320 can convert DC power output from the second power source device 210 into AC power and transmit the AC power to the motor 310 when power output from the second power source device 210 is transmitted to the motor 310. When the motor 310 performs regenerative braking, the inverter 320 can convert AC type of regenerative braking energy generated due to regenerative braking by the motor 310 into AC type and transmit the DC type regenerative braking energy to the second power source device 210.

As described above, the second power source device 210 can use stored power to drive the motor 310, but power is fully discharged or insufficient, it may be supplied with energy generated through regenerative braking by the motor 310 for charging. To this end, a second converter 220 having a first end connected to the second power source device 210 and a second end connected to the motor driving device 300 may be disposed between the second power source device 210 and the motor driving device 300. The second converter 220 can perform work (voltage dropping) of decreasing the output power of the second power source device 210 to power suitable for driving the motor driving device 300, and can perform work (voltage raising) of increasing regenerative braking energy generated due to regenerative braking by the motor 310 to power suitable for charging the second power source device 210. For example, to this end, the second converter may be a Bi-directional High voltage Dc-dc Converter (BHDC).

Meanwhile, the first power source device no can drive electric loads (not shown) disposed in an electrified vehicle. Accordingly, the first power source device no may have low voltage or capacity in comparison to the second power source device 210. For example, the first power source device no may be an auxiliary battery, and particularly, when the second power source device 210 is a high-voltage battery, the first power source device no may be a low-voltage battery having a lower ceiling voltage range or capacitor.

When the power stored in the first power source device no is not enough to drive electric loads, it is possible to perform charging using power that is provided from the second power source device 210 or the motor 310. To this end, the first converter 120 having a first end connected to the first power source device no may be provided. In the present disclosure, since the first power source device no provides power only to electric loads and does not provide power to the second power source device 210 or the motor 310, the first converter 120 can perform only work (voltage dropping) of decreasing power, which is provided from the second power source device 210 or the motor 310, to power suitable for charge the first power source device no. For example, the first converter may be a Low voltage Dc-dc Converter (LDC).

As described above, in order to charge the first power source device no, a second end of the first converter 120 may be connected to the second power source device 210 or the motor driving device 300, depending on the configuration of a power system for an electrified vehicle. In detail, the second end of the first converter 120 may be connected to a node between the second power source device 210 and the second converter 220 and may be connected also to a node between the second converter 220 and the motor driving device 300. However, in this case, power flows through the second converter 220 when the first power source device no is charged with power from the second power source device 210 or generative braking energy of the motor 310. When the first power source device no is charged through the second converter 220, there may be a problem of reduction of charging efficiency.

Accordingly, in order to solve this problem, the switch device 400 can selectively connect the second end of the first converter 120 to the second power source device 210 or the motor driving device 300. The switch device 400 may have a plurality of terminals 410, 420, and 430, which respectively may be a first terminal 410 connected to the second end of the first converter 120, a second terminal 420 connected to the second power source device 210, and a third terminal 430 connected to the motor driving device 300. Accordingly, the switch device 400 can selectively connect the first terminal 410 to the second terminal 420 or the third terminal 430. However, this is only an example, and the switch device 400 may be configured as not only a relay, but a switch (not shown) that can control only ON/OFF.

The power system for an electrified vehicle shown in FIG. 1 is only one embodiment and may be configured in various types. These are described with reference to FIGS. 2 to 7.

FIGS. 2 to 7 are block diagrams showing the configuration of power systems for an electrified vehicle according to various embodiments of the present disclosure.

The power systems for an electrified vehicle shown in FIGS. 2 to 7 may further include a third power source device 610 and a third converter 620 having a first end connected to the third power source device 610 and a second end connected to the motor driving device 300 in addition to the configuration of the power system for an electrified vehicle described above with reference to FIG. 1. For example, the third power source device 610 may be a fuel cell stack and the third converter 620 connected thereto may be a Fuel-cell DC-DC Converter (FDC) that transmits power output from the fuel cell stack to the motor driving device 300.

Figure 2:
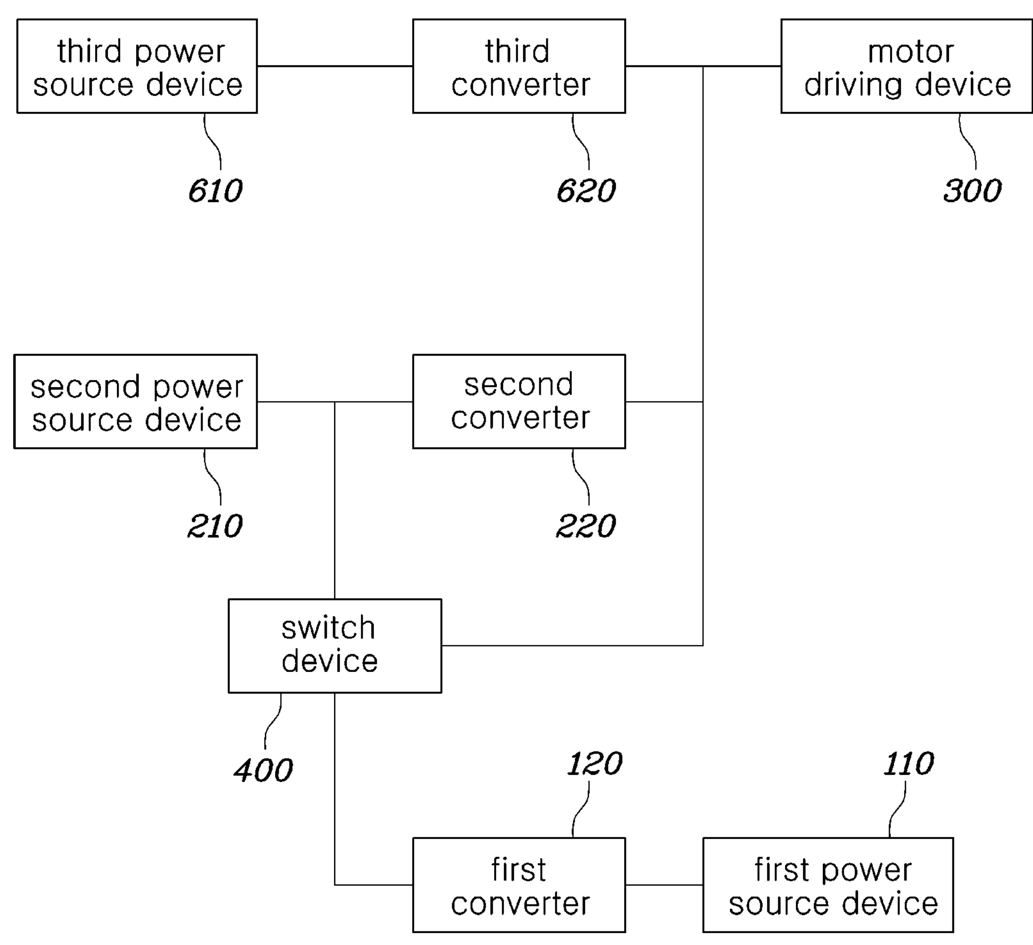
FIGS. 2 to 7 are block diagrams showing the configuration of power systems for an electrified vehicle according to various embodiments of the present disclosure.
Figure 3:
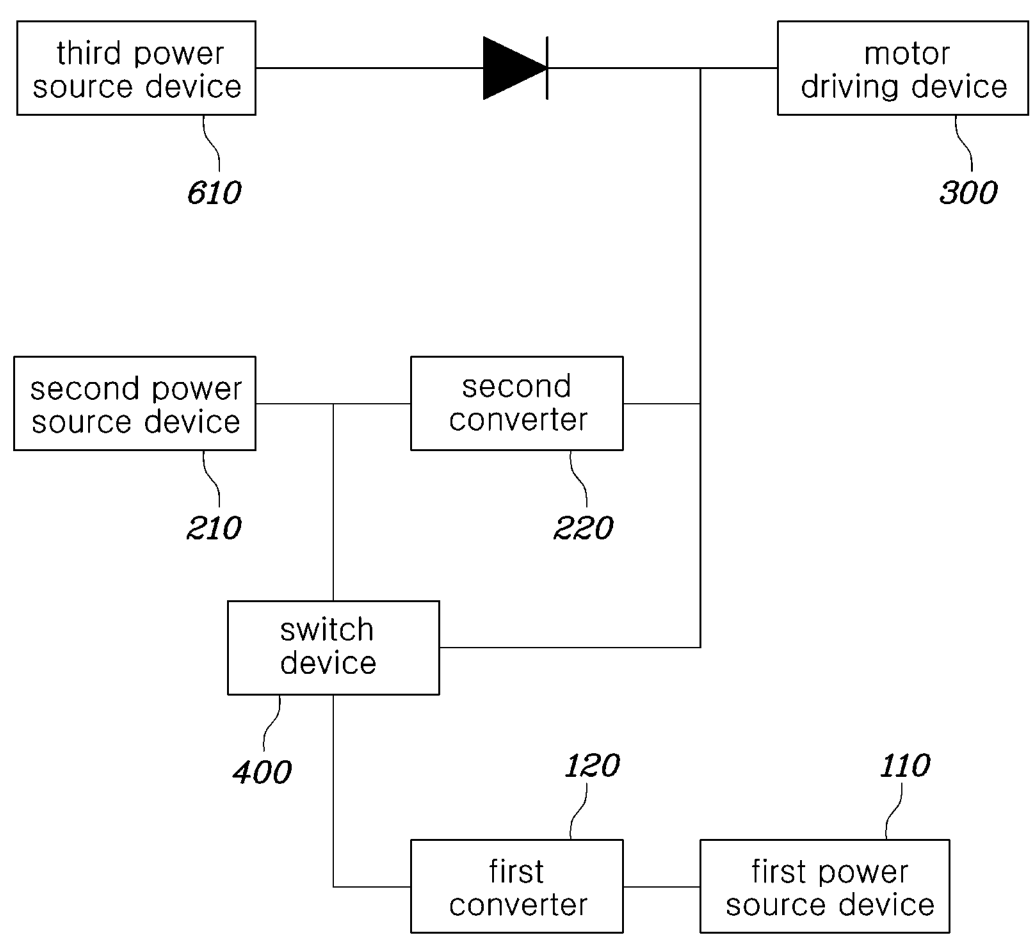
Figure 4:
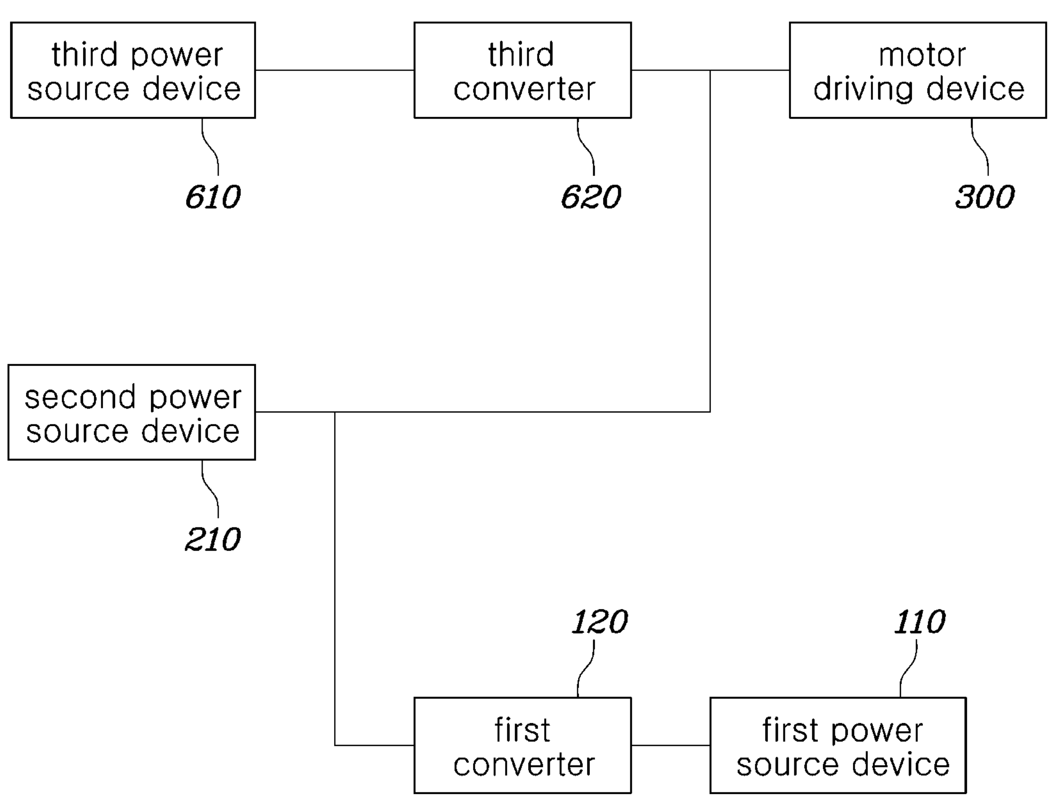
Figure 5:
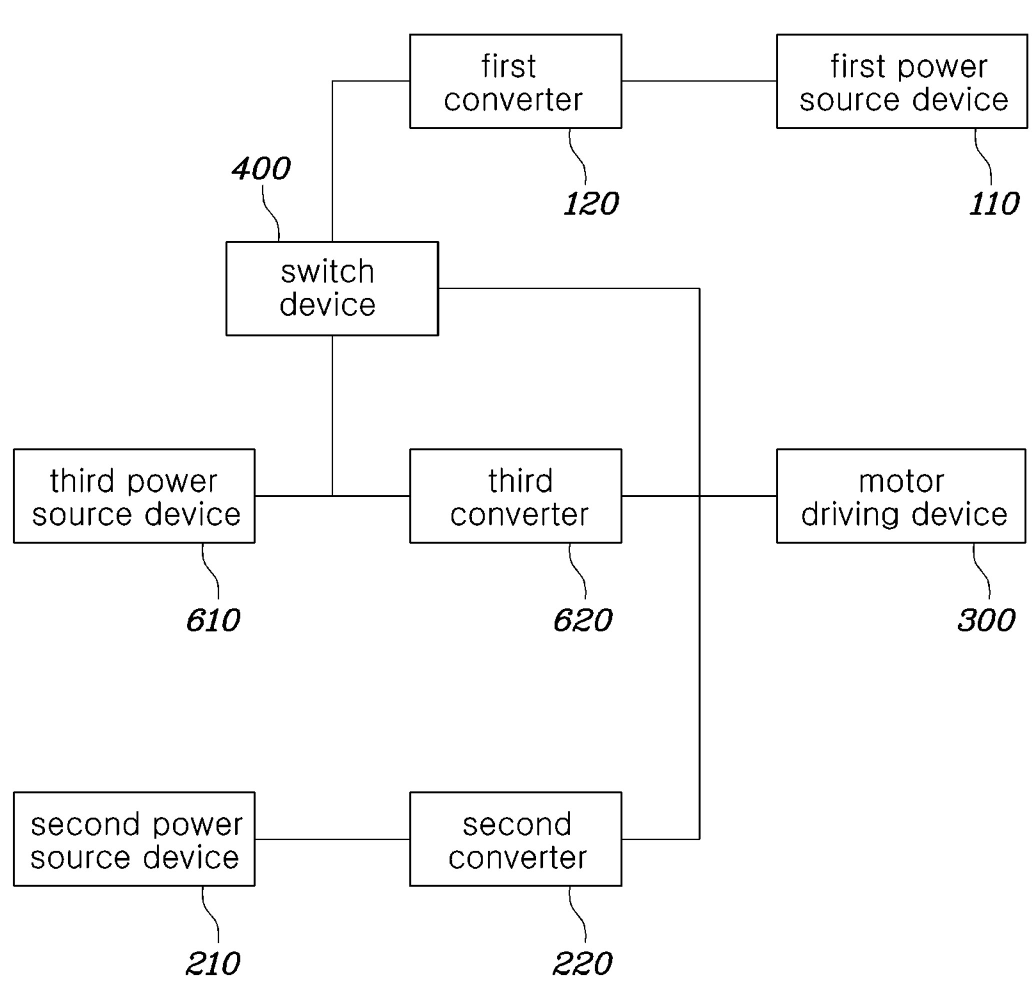
Figure 6:
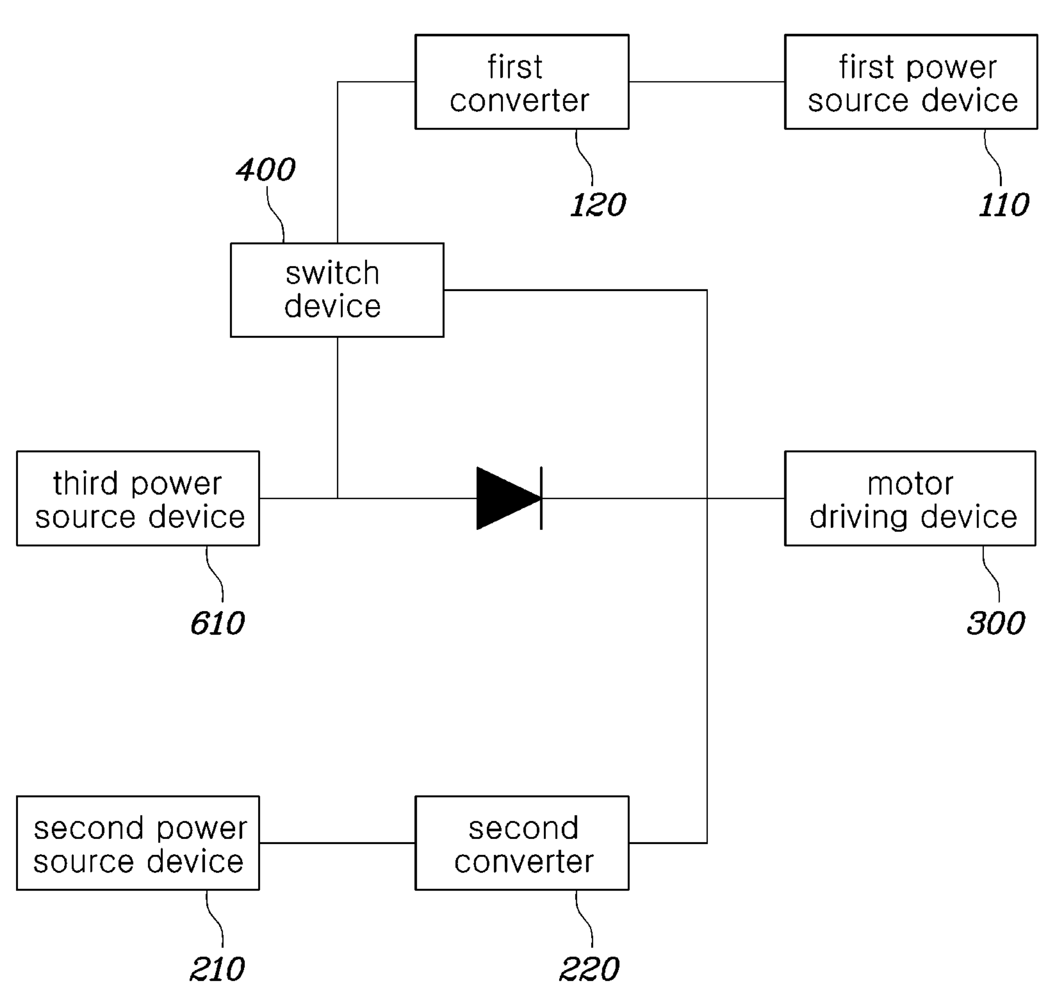
Figure 7:
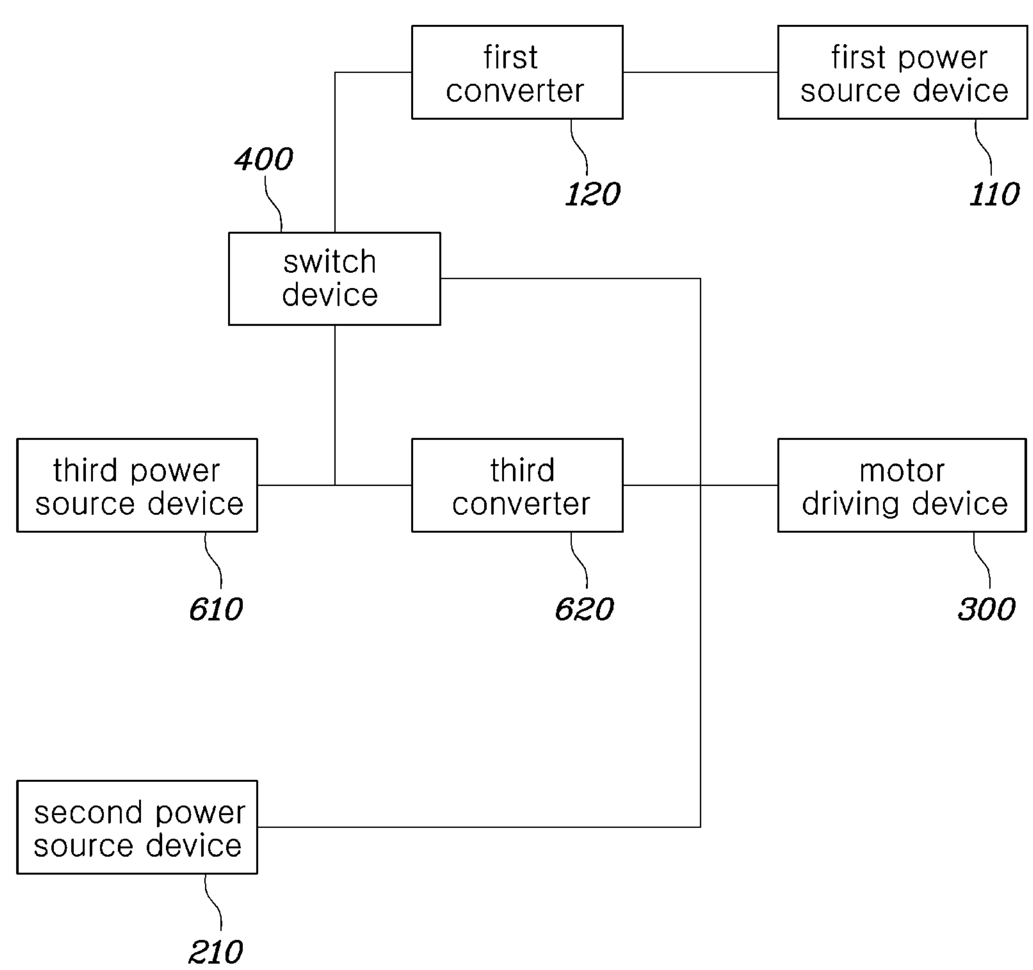

FIGS. 2 to 4 are block diagrams showing cases having a structure similar to that shown in FIG. 1 because the second end of the first converter 120 is connected to the second power source device 210 or the motor driving device 300, and FIGS. 5 to 7 are block diagrams showing cases having a structure different from that shown in FIG. 1 because the second end of the first converter 120 is connected to the third power source device 610 or the motor driving device 300.

First, referring to FIGS. 2 to 3, similar to the case shown in FIG. 1, the switch device 400 can connect the second end of the first converter 120 to the second power source device 210 or the motor driving device 300. According to this configuration, it is possible to use power output from the third power source device 610 to drive the motor driving device 300 or charge the second power source device 210. It is also possible to use power output from the third power source device 610 to charge the first power source device no. Referring to FIG. 2, power output from the second power source device 210 may be provided to the motor driving device 300 or the third power source device 610. However, referring to FIG. 3, a power system may be configured such that power output from the second power source device 210 is not provided and only power output is performed by the third power source device 610 by replacing the third converter 620 connected to the third power source device 610 with a diode.

Further, as shown in FIG. 4, the second converter 220 connected to the second power source device 210 may be excluded from the configuration of the power system for an electrified vehicle. Since the second converter 220 is excluded, it may be possible to efficiently charge the first power source device no using the second power source device 210 or the motor driving device 300 on the basis of only the connection of the components without the switch device 400.

Referring to FIGS. 5 to 7, the switch device 400 can connect the second end of the first converter 120 to the third power source device 610 or the motor driving device 300. For example, the first terminal 410 of the switch device 400 may be connected to the second end of the first converter 120, the second terminal 420 may be connected to a node between the third power source device 610 and the third converter 620, and the third terminal 430 may be connected to a node between the third converter 620 and the motor driving device 300. Accordingly, it is possible to be provided with power of the third power source device 610 or regenerative braking energy of the motor 310 when charging the first power source device 110. It is also possible to provide the power of the second power source device 210 to charge the first power source device no by connecting the second power source device 210 to the node connected with the third terminal 430.

Referring to FIG. 6, similar to the case shown in FIG. 3, a power system for an electrified vehicle may be configured such that power of the third power source device 610 is provided in one direction by replacing the third converter 620 with a diode. Referring to FIG. 7, similar to the case shown in FIG. 4, a power system for an electrified vehicle may be configured without the second converter 220 connected to the second power source device 210. The cases stated with reference to FIGS. 2 to 7 are examples, and of course, a power system for an electrified vehicle may be configured substantially in various types by changing the arrangement of the components described above or by reducing the number of the components or replacing the components.

Referring back to FIG. 1, the controller 500 can control connection of the switch device 400. The controller 500 can perform control such the second end of the first converter 120 is connected to the second power source device 210 when the first power source device no is charged with the power of the second power source device 210 and such that the second end of the first converter 120 is connected to the motor driving device 300 when the motor 310 performs regenerative braking. In detail, the controller 500 can perform control such the first terminal 410 of the switch device 400 is connected to the second terminal 420 when the first power source device no is charged with the power of the second power source device 210 and such that the first terminal 410 is connected to the third terminal 430 when the motor 310 performs regenerative braking.

As shown in FIGS. 5 to 7, when the third power source device 610 and the third converter 620 are included in a power system for an electrified vehicle, the controller 500 may perform such that the first terminal 410 connected to the first converter 120 is connected to the second terminal 420 connected to the third power source device 610 and the first power source device no is charged with the power of the third power source device 610. Flow of power or energy when the controller 500 controls the switch device 400 is described hereafter with reference to FIGS. 8 to 9.

Figure 8:
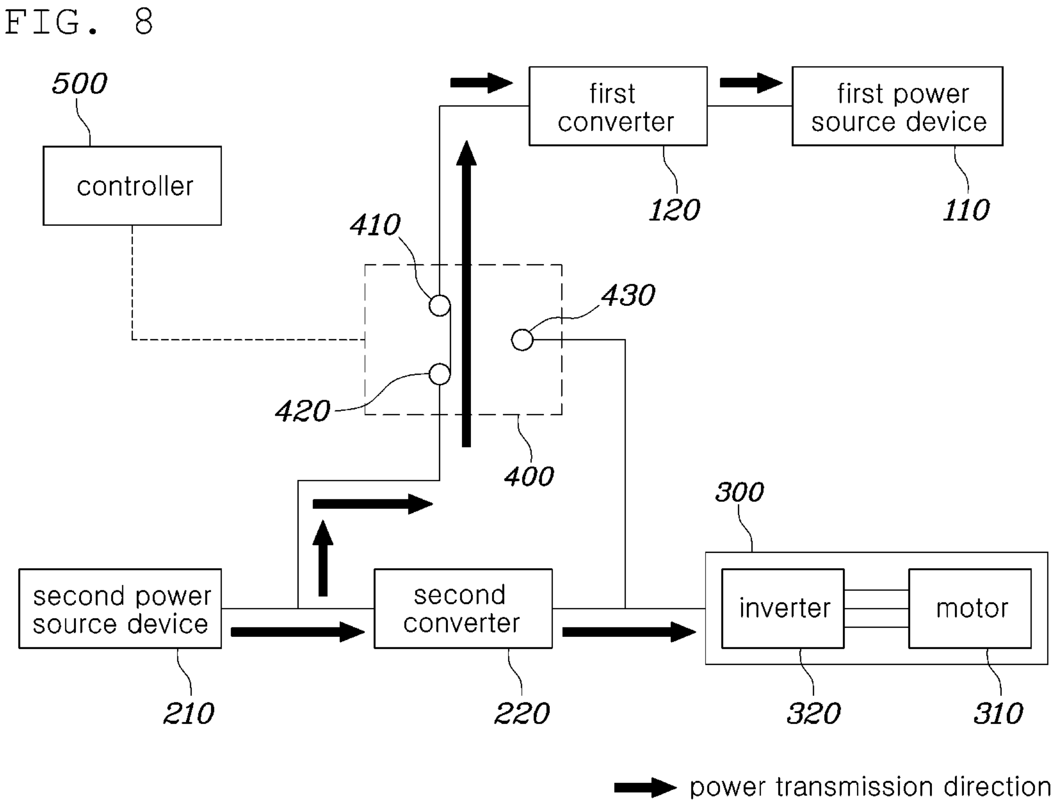
FIGS. 8 to 9 are diagrams showing flow of power or regenerative braking energy under control by a power system for an electrified vehicle according to an embodiment of the present disclosure.
Figure 9:
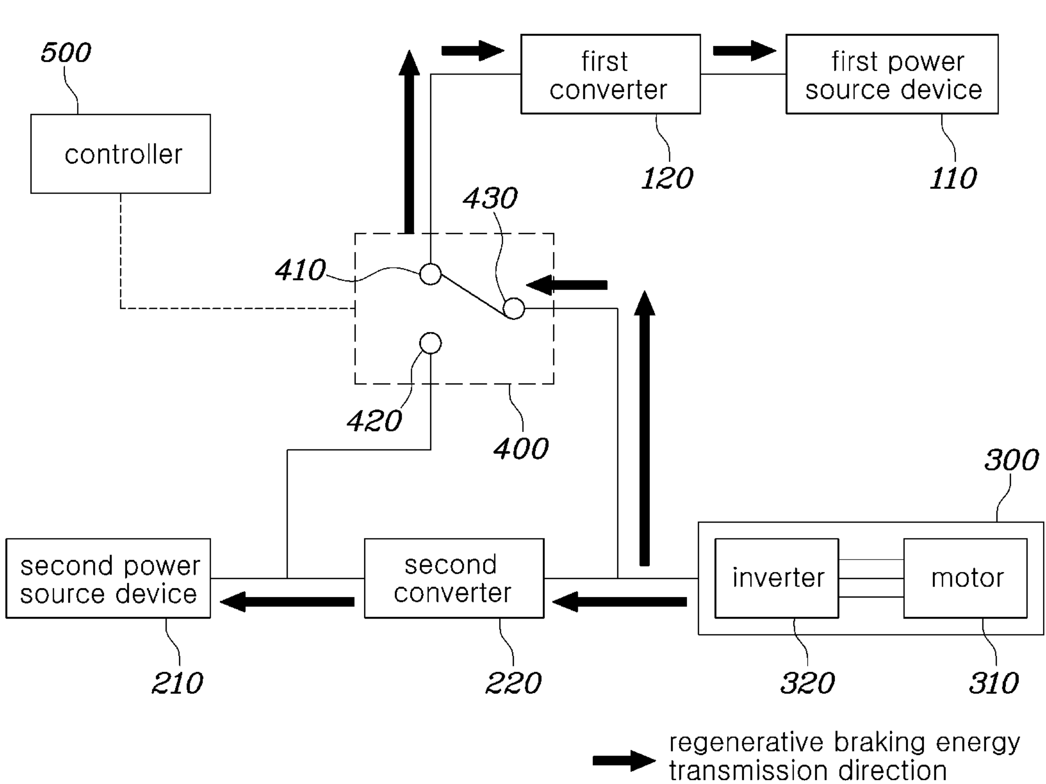

FIGS. 8 to 9 are diagrams showing flow of power or regenerative braking energy under control by a power system for an electrified vehicle according to an embodiment of the present disclosure.

Referring to FIG. 8, the controller 500 performs control such that the first terminal 410 and the second terminal 420 of the switch device 400 are connected to each other, whereby it is possible to charge the first power source device no using the power of the second power source device 210. Accordingly, the power of the second power source device 210 is transmitted to the first power source device no directly through the first converter 120 without passing through the second converter 220, so it is possible to increase the efficiency of charging the first power source device 110.

Referring to FIG. 9, when the motor 310 performs regenerative braking, the controller 500 performs control such that the first terminal 410 and the third terminal 430 of the switch device 400 are connected to each other, whereby it is possible to charge the first power source device no using the regenerative braking energy of the motor 310. However, when the motor 310 performs regenerative braking, the controller 500 may determine whether a predetermined condition is satisfied and perform control such that the first power source device no is charged.

For example, the controller 500 can determine whether regenerative braking power that is generated when the motor 310 performs regenerative braking exceeds the maximum power of the first converter 120 or whether the State of Charge (SOC) of the first power source device no is less than a reference SOC. However, this is an example, and of course, there may be various predetermined conditions for charging the first power source device 110. Accordingly, the controller 500 determines that the predetermined condition is satisfied when the regenerative braking power of the motor 310 exceeds the maximum power of the first converter 120 or when the SOC of the first power source device no is less than a reference SOC, whereby the first power source device no can be charged with the regenerative braking energy generated by the motor 310.

Accordingly, the regenerative braking energy generated due to regenerative braking by the motor 310 is transmitted to the first power source device no without passing through the second converter 220, so the efficiency of charging the first power source device no can be increased. Further, regenerative braking energy that can be stored through regenerative braking by the motor 310 can be increased by the power system of the present disclosure. For example, storable regenerative braking energy is determined by the second power source device 210 and the second converter 220 in the related art, but in the present disclosure, not only the second power source device 210 and the second converter 220, but the first power source device 110 and the first converter 120 participate in this process, whereby the storable regenerative braking energy can be increased in comparison to the related art.

Hereafter, a method of controlling a power system for an electrified vehicle according to an embodiment is described with reference to FIG. 10 on the basis of the configurations of a power system for an electrified vehicle described above.

FIG. 10 is a flowchart of a method of controlling a power system for an electrified vehicle according to an embodiment of the present disclosure.

Referring to FIG. 10, the controller 500 can determine whether to charge the first power source device 110 through the second power source device 210 or the third power source device 610 (Silo). When the first power source device 110 is charged through the second power source device 210 or the third power source device 610 (Yes in Silo), the controller 500 can control the switch device 400 such that the second end of the first converter 120 is connected to the second power source device 210 or the third power source device 610 (Silo).

When the first power source device 110 is not charged through the second power source device 210 or the third power source device 610 (No in S110), the controller 500 can determine whether to perform regenerative braking through the motor 310 (S130).

When regenerative braking is performed through the motor 310 (Yes in S130), the controller 500 can determine whether a charging condition for the first power source device 110 is satisfied (S140) and the first power source device no can be charged with regenerative braking energy generated due to regenerative braking by the motor 310.

When the charging condition for the first power source device no is satisfied (Yes in S140), the controller 500 can control the switch device 400 such that the second end of the first converter 120 and the motor driving device 300 are connected to each other (S150). Further, the controller 500 can determine whether to end regenerative braking (S160) and can maintain or change connection of the switch device 400. Accordingly, the controller 500 controls the switch device 400 in accordance with the sources that generate charge power or energy for charging the first power source device no, whereby a loss of charge power or energy is prevented and the efficiency of charging the first power source device no can be increased.

In the description of a method of controlling a power system for an electrified vehicle of the present disclosure based on FIG. 10, although the step (Silo) of determining whether to charge the first power source device no through the second power source device 210 or the third power source device bio and the step (S130) of determining whether to perform regenerative braking through the motor 310 were sequentially described, these two steps (Silo and S130) do not necessarily have a sequential relationship. Accordingly, the flowchart shown in FIG. 10 is only one embodiment according to the control method of the present disclosure, and of course, the two steps (Silo and S130) may be changed in order or may be simultaneously performed.

Although the present disclosure was provided above in relation to specific embodiments shown in the drawings, it is apparent to those skilled in the art that the present disclosure may be changed and modified in various ways without departing from the scope of the present disclosure, which is described in the following claims.

The present disclosure can be achieved as computer-readable codes on a program-recoded medium. A computer-readable medium includes all kinds of recording devices that keep data that can be read by a computer system. For example, the computer-readable medium may be an HDD (Hard Disk Drive), an SSD (Solid State Disk), an SDD (Silicon Disk Drive), a ROM, a RAM, a CD-ROM, a magnetic tape, a floppy disk, and an optical data storage. Accordingly, the detailed description should not be construed as being limited in all respects and should be construed as an example. The scope of the present disclosure should be determined by reasonable analysis of the claims and all changes within an equivalent range of the present disclosure is included in the scope of the present disclosure.

What is claimed is:

1. A power system for an electrified vehicle, the power system comprising:

- a first power source device;
- a first converter having a first end connected to the first power source device;
- a second power source device;
- a motor driving device comprising a motor and an inverter;
- a switch device configured to selectively connect a second end of the first converter to only one of the second power source device or the motor driving device; and
- a controller configured to control the switch device such that either the second end of the first converter is connected to the second power source device so that the first power source device is charged with power of the second power source device or such that the second end of the first converter is connected to the motor driving device based on the motor performing regenerative braking.

2. The power system of claim 1, wherein the switch device comprises:

- a first terminal connected to the second end of the first converter;
- a second terminal connected to the second power source device; and
- a third terminal connected to the motor driving device, wherein the first terminal is selectively connected to the second terminal or the third terminal.

3. The power system of claim 2, further comprising a second converter having a first end connected to the second power source device and a second end connected to the motor driving device, wherein the second terminal is connected to a node between the second power source device and the second converter and the third terminal is connected to a node between the second converter and the motor driving device.

4. The power system of claim 1, wherein the controller is configured to determine whether a charging condition for the first power source device is satisfied based on the motor performing regenerative braking, and to control the switch device such that the second end of the first converter is connected to the motor driving device based on the charging condition for the first power source device being satisfied.

5. The power system of claim 3, wherein the power system is designed so that a charging condition for the first power source device occurs based on regenerative braking power of the motor exceeding maximum power of the first converter and a state-of-charge (SOC) of the first power source device being less than a reference SOC.

6. The power system of claim 1, further comprising:

- a third power source device; and
- a third converter having a first end connected to the third power source device and a second end connected to the motor driving device.

7. The power system of claim 6, wherein the switch device is configured to selectively connect the second end of the first converter to a node between the third power source device and the third converter or a node between the third converter and the motor driving device.

8. The power system of claim 7, wherein the controller is configured to perform control such that either the second end of the first converter is connected to the node between the third power source device and the third converter so that the first power source device is charged with power of the third power source device or such that the second end of the first converter is connected to the node between the third converter and the motor driving device based on the motor performing regenerative braking.

9. A method of controlling a power system for an electrified vehicle, the method comprising:

determining whether a first power source device is to be charged with power of a second power source device or with a motor performing regenerative braking; and controlling a switch device such that a second end of a first converter having a first end connected to the first power source device is connected to either the second power source device based on determining that the first power source device is to be charged with power of the second power source device or a motor driving device based on the motor performing regenerative braking and determining that the first power source device is to be charged with the motor.

10. The method of claim 9, wherein the controlling of the switch device further comprises connecting the second end of the first converter to the second power source device so that the first power source device is charged with power of the second power source device.

11. The method of claim 9, wherein controlling the switch device comprises determining whether a charging condition for the first power source device is satisfied based on the motor performing regenerative braking, and controlling the switch device such that the second end of the first converter is connected to the motor driving device based on the charging condition for the first power source device being satisfied.

12. The method of claim 10, wherein a charging condition for the first power source device occurs based on regenerative braking power of the motor exceeding maximum power of the first converter and an SOC of the first power source device being less than a reference SOC.

13. The method of claim 9, wherein controlling the switch device further comprises performing control such that either the second end of the first converter is connected to a third power source device so that the first power source device is charged with power of the third power source device or such that the second end of the first converter is connected to the motor driving device based on the motor performing regenerative braking.

14. A method of controlling a power system for an electrified vehicle, wherein the power system comprises a first power source device, a second power source device, a motor driving device having a motor, a first converter having a first end connected to the first power source device, and a switch device, the method comprising:

controlling the switch device to selectively connect a second end of the first converter to only one of the second power source device or the motor driving device;

at a first time, connecting the first power source device to the second power source device so that the first power source device is charged with power of the second power source device; and at a second time, connecting the first power source device to the motor driving device based on the motor performing regenerative braking.

15. The method of claim 14, wherein controlling the switch device comprises determining whether a charging condition for the first power source device is satisfied based on the motor performing regenerative braking, and controlling the switch device such that the second end of the first converter is connected to the motor driving device based on the charging condition for the first power source device being satisfied.

16. The method of claim 15, wherein the charging condition for the first power source device occurs based on regenerative braking power of the motor exceeding maximum power of the first converter and a state-of-charge (SOC) of the first power source device being less than a reference SOC.

17. The method of claim 14, wherein controlling the switch device further comprises performing control such that either the second end of the first converter is connected to a third power source device so that the first power source device is charged with power of the third power source device or such that the second end of the first converter is connected to the motor driving device based on the motor performing regenerative braking.

* * * * *